United States Patent

Okubo et al.

[11] Patent Number: 5,866,003
[45] Date of Patent: Feb. 2, 1999

[54] APPARATUS FOR DEGRADING POLLUTANT, PROCESS FOR PURIFYING CONTAMINATED MEDIUM AND PROCESS FOR DEGRADING POLLUTANT

[75] Inventors: Yukitoshi Okubo, Yokohama; Toshiyuki Komatsu, Hiratsuka; Kazumi Tanaka, Yokohama; Masanori Sakuranaga, Atsugi; Yuji Kawabata, Isehara, all of Japan

[73] Assignee: Canon Kabushiki Kaisha, Tokyo, Japan

[21] Appl. No.: 843,615

[22] Filed: Apr. 10, 1997

[30] Foreign Application Priority Data

| Apr. 12, 1996 | [JP] | Japan | 8-091515 |
| Apr. 7, 1997 | [JP] | Japan | 9-088338 |

[51] Int. Cl.$^6$ .................................................. C02F 3/02
[52] U.S. Cl. ................... 210/610; 210/620; 210/631; 210/199; 210/205; 210/206
[58] Field of Search .................... 210/610, 611, 210/615–617, 620, 627, 631, 759, 150, 151, 192, 198.1, 199, 206, 205, 209, 220

[56] References Cited

U.S. PATENT DOCUMENTS

| 3,252,786 | 5/1966 | Bozzelli et al. | 71/64 |
| 3,300,293 | 1/1967 | Bozzelli et al. | 71/28 |
| 4,401,569 | 8/1983 | Jhaveri et al. | 210/610 |
| 4,620,929 | 11/1986 | Hofmann | 210/610 |
| 4,657,576 | 4/1987 | Lambie | 71/64.07 |
| 4,810,385 | 3/1989 | Hater et al. | 210/610 |
| 4,925,564 | 5/1990 | Francis | 210/610 |
| 5,057,221 | 10/1991 | Bryant et al. | 210/610 |
| 5,080,782 | 1/1992 | Caplan et al. | 210/151 |
| 5,232,584 | 8/1993 | Wang et al. | 210/205 |
| 5,340,376 | 8/1994 | Cunningham | 210/610 |
| 5,478,464 | 12/1995 | Cyr | 210/199 |
| 5,725,885 | 3/1998 | Felix et al. | 210/610 |
| 5,770,074 | 6/1998 | Haase | 210/611 |

FOREIGN PATENT DOCUMENTS

| 3621313 | 1/1988 | Germany . |
| 3937593 | 2/1991 | Germany . |
| WO 91-19039 | 6/1991 | WIPO . |

OTHER PUBLICATIONS

Nakajima, et al., "Novel Metabolite . . . Pathway", Biosc. Biotech. Biochem. 56 (3) 486–489 (1992).
Nelson, et al., "Aerobic Metabolism . . . Isolate", Appl. & Environ. Microbiol., 52 (2) 383–84 (1986).
Nelson, et al., "Biodegradation . . . Pathway", Appl. & Environ. Microbiol., 53 (5) 949–954 (1987).
Vandenbergh, et al., "Metabolism . . . fluorescens", Appl. & Environ. Microbiol. 54 (10) 2578–2579 (1988).
Wackett, et al., "Degradation . . . F1", Appl. & Environ. Microbiol., 54 (7) 1703–1708 (1988).
Hanson, et al, "Development of Methanotrophs . . . Olefins", Preprint Extended Abstract, Div. Env. Chem., A.C.S., pp. 365–367, Sep. 10–15, 1989.
Eng et al, "Methanol Suppression of Trichloroethylene . . . Cultures", Appl. Biochem.& Biotech., vol. 28/29, pp. 887–899 (1991).
Little, et al., "Trichloroethylene Biodegradation . . . Bacterium", Appl. & Environ. Microb., 54, 4, pp. 951–956 (1988).
Folsom, et al. "Phenol and Trichloroethylene. . . Substrates", Appl. & Environ. Microb., 56, 5, pp. 1279–1285 (1990).
Sheilds, et al., "Mutants of Pseudomonas . . . and Trichloroethylene", Appl. & Environ. Microb., 57, 7, pp. 1935–1941 (1991).

Primary Examiner—Thomas G. Wyse
Attorney, Agent, or Firm—Fitzpatrick, Cella, Harper & Scinto

[57] ABSTRACT

An apparatus for degrading a pollutant to purify a medium containing a pollutant using a microorganism, which comprises a container in which a region containing a microorganism capable of degrading the pollutant is provided, wherein the container has the first opening for introducing the medium into the container and the second opening for draining the medium passed through the region containing the microorganism from the container, and in the container a region containing a functional material which releases a material required for degrading the pollutant by the microorganism is provided between the first opening and the region containing microorganism.

17 Claims, 3 Drawing Sheets

APPARATUS FOR DEGRADING POLLUTANT, PROCESS FOR PURIFYING CONTAMINATED MEDIUM AND PROCESS FOR DEGRADING POLLUTANT

BACKGROUND OF THE INVENTION

1. Field of the Invention

The present invention relates to an apparatus for microbiologically degrading a pollutant, a process for microbiologically purifying a medium containing a pollutant and a process for microbiologically degrading a pollutant.

2. Related Background Art

Recently, there has been a serious problem of environmental pollution caused by hydrocarbons such as aromatic hydrocarbons, paraffin and naphthene, or organochlorine compounds such as trichloroethylene, tetrachloroethylene and trichloroethane.

Many of these compounds penetrate into soils, not degraded, and gradually dissolve in ground water and the contamination spreads through the ground water.

It has been strongly desired to establish technology for preventing such serious environmental pollution from occurring, for remedying the environment which has already been contaminated, that is, restoring the environment to the original state.

Examples of the environmental restoration technology include aeration treatment where the contaminated ground water is pumped up, and volatile organic compounds are separated from the water and adsorbed by activated charcoal, heat treatment where the contaminated soil is exposed to the sun or a heat source to evaporate volatile organic substances with heat, vacuum extraction process in which a borehole was made into the contaminated soil, and the pollutant is sucked under vacuum, or vacuum pan treatment in which the contaminated soil is put in a vacuum pan and heated and sucked to extract the pollutant.

These physical and chemical treatments may be particularly effective for local contamination of high concentration, but not for large region contamination of low concentration in view of processing speed improvement or the cost reduction.

Besides, these organic substances recovered by the activated charcoal adsorption still need further treatment to be made into harmless substances since these organic substances are usually hard to be degraded.

Recently, biotreatment utilizing microorganisms has been studied as soil remediation technology to overcome the aforementioned problems with these physical and chemical treatments.

With the process utilizing microorganisms to degrade the pollutant, particularly microorganisms living in soil, it is expected that the remediation can be carried out by natural energy and with less energy input, and that the degradation proceeds to the final products of water and carbon dioxide.

Under such expectation, bioremediation has recently been attracting attention.

There are many microorganisms known to degrade compounds such as aromatic hydrocarbons and organochlorine compounds which are difficult to be degraded and pollutants of soil and ground water. Also almost all substances required by the microorganisms are known. These substances are gas, liquid or solid. But, when these substances are carelessly fed to the polluted environment, the supply may be excess or insufficient failing to provide balanced supply, they may affect the various ecosystems in the environment or spoil proper bioremediation. In addition, it is required a large scale facility to externally control the accurate supply of these substances into the soil, and the primary object of the bioremediation to exploit natural power as much as possible might be lost.

Conventional methods of bioremediation are classified as follows according to the process of introducing the degrading microorganisms.

The most primitive method is called biofarming, in which the contaminated soil is harrowed to be oxygenated, thereby the microorganisms in the soil are activated and degrade the pollutant. This method stands on the fact that "almost every substance in the soil has its microorganisms for degradation" and the microorganisms are utilized without being particularly specified. This method is effective when the pollutant is easily degradable by microorganisms and present in relatively shallow soil, near the surface. For example, it can be effectively applied to the pollution with hydrophobic hydrocarbons having a relatively small specific gravity or vegetable oils.

"Biostimulation" also utilizes indigenous microorganisms, but nutrients and oxygen are supplied to the contaminated soil to activate the indigenous microbes living in the contaminated for pollutant degradation. For example, this process is often used in purification of the soil contaminated with petroleum. In this case, nutrients other than the carbon source are introduced from outside to maintain the growth and the activity of the microbes to degrade the pollutant, i.e. petroleum.

Accordingly, the technical problem of such remediation methods is the supply of oxygen and nutrients containing nitrogen and phosphorus which are in short. As a similar method employing degrading microbes, there is activated sludge process used in waste water treatment. Activated sludge process, though not a soil remediation process, is similar to the above mentioned process in technology. In the waste water treatment, waste water is usually rich in nutrients for the microorganisms, not only the carbon source but also nitrogen and phosphorus compounds. Thus, oxygen supply is critical for the purification. In those methods, the microorganisms indigenous to the environment to be remedied are activated, and the microorganisms are often not specified.

On the other hand, volatile organochlorine compounds which are highly penetrable into the ground and hard to be degraded may not be easily degraded by the indigenous microbes. In other words, sometimes there are no degrading microbes present since these compounds are artificial substances not present in nature. Even if degrading microbes are present for such compounds, the location deep under the ground is not suitable for the growth of such microbes. There comes the bioaugmentation method characterized in that a microorganism selected for an ability to degrade the hardly-degradable substance is cultured and supplied to the contaminated region together with the functional materials necessary for growth and degradation.

In any of the processes, the common technical problem is supply of nutrients and oxygen to the contaminated region remains the same. Usually air is sent to supply oxygen, and the nutrients is supplied as an aqueous solution.

Since the microbes living in the soil are adhering to a solid or suspended in a liquid, not all of the supplied liquid nutrients or gaseous oxygen are utilized by the pollutant-degrading microorganisms, and a part of the nutrients and oxygen may be used by other microorganisms which do not contribute to degradation of the pollutant, be eluted from the region, or be left unused resulting in a decrease of utilization efficiency.

Consumption of the supplied nutrients by the microorganisms which do not contribute to the degradation of the pollutant not only means that the loss of the nutrients, but also means more oxygen consumption by the activated microorganisms which do not contribute to the degradation preventing the activity of degrading microorganisms. The gas supply has the same problem. In addition, when the nutrients and oxygen which can be easily utilized by the microorganisms are supplied at one time, drastic growth and activation of the microorganisms occur in a short time, and it does not synchronize with the slow movement of the pollutant in the region, resulting in low utilization efficiency and short effective period of the biodegradation. The nutrient loss into the ground water might need sufficient consideration since it may cause second environmental pollution.

No comprehensive means to solve such problems have been disclosed so far.

According to conventional methods to supply nutrients into the ground, the nutrients are dissolved in water, and the aqueous solution is directly sparged over the contaminated soil, or sent with pressure through a pipe provided in the ground. For example, in DE 3621313 C2 (1986. 6. 25 Chemic Fabrik, Dr. Worbs KG) is described a method where inorganic fertilizers ($Na^+$, $K^+$ and the like, ions of nitrogen, sulfur, and phosphorus, B, Mn, and Cu and the like) are repeatedly applied to the contaminated soil from the surface, and hydrogen peroxide and nitrate are applied into the soil as an inorganic oxidizing agent, or air (oxygen) is blown into the soil, to activate the soil microorganisms for pollutant degradation. In this method, it is difficult to supply an appropriate amount of the nutrients corresponding to the degradation activity of the degrading microorganisms, and it is necessary to control the amount of supply by monitoring the activity of the microorganisms in the soil. According to this method, the nutrients might be shared by the non-degrading microorganisms so that the input efficiency of the functional materials might be lowered, or the surplus nutrients and the like might be released.

In U.S. Pat. No. 5,080,782 and DE 3937593 C1, a pollutant-degrading method has been proposed in which ground water is pumped through a plurality of wells provided within the contaminated soil, and the ground water is treated in a bioreactor or a water storing tank, and then re-injected into the contaminated soil. This process allows accurate monitoring of the condition of the contaminated ground water, and the microbial activity function can be appropriately controlled in a bioreactor, on the other hand a sophisticated facility must be provided on the ground and the continuous control is required, thus spoils the advantages of the in situ bioremediation which utilizes the natural restoration power.

In U.S. Pat. No. 4,401,569 is disclosed a process in which a gas and nutrients are supplied to a region contaminated with halogenated hydrocarbons, the ground water is removed from the region through a draining trench, and the pollutant-degrading microbes in the soil are activated. Like the above-mentioned conventional methods, nutrients and the gas are given as fluid, a large amount of which is circulated in this method. Therefore, also this process has above-mentioned drawbacks that it requires a considerable size of equipment on the ground and that utilization efficiency of the supplied material is low since the nutrients supplied into wide region allows the proliferation of non-degrading microorganisms.

The supply of oxygen and nutrients to the microorganisms in the soil by the movement of natural air and water has similarity to the supply of fertilizers in agriculture. In agriculture, water soluble nutrients such as chemical fertilizers can be directly given to plants, while some organic fertilizers such as manure are once metabolized by microorganisms in soil and the resulting metabolites are utilized gradually by the plants. The former is quick acting, while the latter is relatively slow acting because of the mediation of microorganisms. In this context, there have been devised slow acting chemical fertilizers where release the nutrients slowly. In U.S. Pat. No. 4,657,576 to Johannes Lambie et al. is disclosed a slow-releasing chemical fertilizer consisting of urea dispersed in a wax. In U.S. Pat. No. 3,300,293 and U.S. Pat. No. 3,252,786 to Andrew Bozzelli et al. is proposed a chemical fertilizer having epoxy-polyester resin coating. Such a device applied to microbial remediation to make the component which is quick acting in fluid slow acting is disclosed in W091/19039 (1990 6. 8, Grace Sila Horticultural Products Company), in which a water soluble nutrient is encapsulated with linseed oil and dichloropentadiene resin to apply them into the contaminated soil. An aim of this proposal is the maintained pollutant degradation by the microorganisms.

In this process, the durability of the supply of the nutrients has been improved, but it has the same defect as that of giving the nutrient in the fluid form on a point that the nutrients are shared by ambient non-degrading microorganisms which do not contribute to the degradation of the pollutants.

There has been made a proposal from a different stand point, in which immobilized microorganisms and nutrients is located in a pass of polluted fluid.

In U.S. Pat. No. 4,810,385 discloses a process for treating waste water comprising disposing in a pass of waste water a vessel of a porous package in which dried microbial culture is sealed.

SUMMARY OF THE INVENTION

The present invention has been made in view of the above-mentioned problems, and its object is to provide an apparatus for degrading a pollutant which can preferentially activate microorganisms capable of degrading the pollutant.

Another object of the present invention is to provide a process for purifying a contaminated medium, in which the degrading activity of the pollutant-degrading microorganisms are maintained for a long time and the purification of the medium containing the pollutant is carried out efficiently.

A still another object of the present invention is to provide a process for degrading a pollutant, which enables maintenance of the pollutant-degrading activity of the microorganism for a long time, and effective degradation of the pollutant in the medium.

According to one aspect of the present invention, there is provided an apparatus for degrading a pollutant to purify a medium containing the pollutant by using a microorganism, comprising a container in which a region containing a microorganism capable of degrading the pollutant is provided, wherein the container has a first opening for introducing the medium into the container and a second opening for draining the medium passed through the region containing the microorganism from the container, and in the container a region containing a functional material which releases a material required by the microorganism for degrading the pollutant is provided between the first opening and the region containing the microorganism.

According to another aspect of the present invention, there is provided a process for purifying a flow of a medium containing a pollutant, comprising the steps of:

providing an apparatus for degrading a pollutant comprising a container in which a region containing a microorganism capable of degrading the pollutant is provided, wherein the container has a first opening for introducing the medium into the container and a second opening for draining the medium passed through the region containing microorganism from the container, and in the container a region containing a functional material which releases a material required by the microorganism for degrading the pollutant is provided between the first opening and the region containing the microorganism; and locating the apparatus for degrading the pollutant in the flowing medium so that the pollutant is introduced into the container from the first opening.

According to still another aspect of the present invention, there is provided a process for degrading a pollutant by providing a microorganism capable of degrading the pollutant in a flow of a medium containing the pollutant, comprising the steps of:

providing a functional material which releases a material required for degrading the pollutant by the microorganism in the flow of the medium; and disposing the microorganism in the flow of the medium downstream from the functional material thereby the pollutant is degraded by the microorganism.

DETAILED DESCRIPTION OF THE PREFERRED EMBODIMENTS

The pathway through which the soil contamination substantially affects the environment depends on the properties of the pollutant and the contamination conditions. When the organochlorine solvents leak out underground, which has been a particularly serious problem these years, they penetrate deep into the ground and gradually dissolve in the ground water, and migrate with the ground water to spread contamination. Therefore, often the pollution is not recognized until the ground water in the downstream region is directly utilized, or until the underflow current wells out or further flows into a river and the like. In a highly polluted area, the pollutant evaporates and causes an air pollution as well. In either pollution, the problem is that the pollutant spreads in the fluid form, and the environmental pollution enlarges.

The present invention relates to a method of purifying the contaminated medium in the pass of a natural or artificial flow of the medium.

When applied to the pollution spread by ground water flow, the polluted water is purified by passing through a water permeable site which enables the microbial degradation provided in the flow. When applied to the polluted gas exhausted on vacuum extraction or aeration of the polluted ground water, purification is carried out by passing the gas through the gas permeable microbial degradation site.

When organochlorine type solvents having a high specific gravity, deep underground, are to be biodegraded, necessary materials therefor include, first of all, the microorganism which can degrade these substances. Since in ordinary indigenous microorganisms, is hardly present such a microorganism that can degrade artificially synthesized and stable materials, in examples according to the present invention the pollutant-degrading microorganism is introduced from outside. Then oxygen is necessary if the microorganism is aerobic. Oxygen supply is important since the ground water and ground air often contain smaller amounts of oxygen than the atmosphere does, and oxygen consumption will increase when the microorganism is activated. Nutrients are also required for activating the microorganism. Nutrients include nitrogen, phosphorus and carbon as well as minerals. In an ordinary microorganism culture, air is supplied for oxygen and the nutrients are supplied in the form of water soluble materials. The present invention is to improve some points of the conventional process to supply materials for growth and activation of the microorganism inconvenient in actual biodegradation process.

The unselective air supply into the contaminated region has three problems. First, if the pollutant is a volatile substance, the supplied air allows the pollutant to evaporate. Accordingly, aeration must be carried out based on the careful calculation of the degradation caused by the microorganisms and the physical release of the pollutant. This may be possible in the case of closed environment under certain conditions, but in the case of a free system, it will be necessary to provide a measure to cope with the volatile pollutant released from the system. Second, through the unselective air supply, the air is supplied even to indigenous microorganisms, and the utilization efficiency of the air by the pollutant-degrading microorganism is lowered, or in some cases, the activity of the pollutant-degrading microorganism will be inhibited. Third, supply of a large amount of air, or continuous air supply will incur increase in the size and the running cost of the equipment.

One of the features of the present invention is to slowly supply a material required by the microorganism for degrading the pollutant, such as oxygen, into a region where the degrading microorganism is present. According to the present invention, oxygen is allowed to co-migrate downstream with the pollutant in the region wherein the pollutant-degrading microorganism is present, instead of supplying oxygen to the degrading microorganism at once. In one exemplary process, a region containing a pollutant-degrading microorganism is provided in a flow of a medium containing the pollutant, and a functional material which releases oxygen, such as a solid oxygen donor or an oxygen donor in a solid form, is provided upstream.

Examples of the oxygen donor in a solid form include a material made of gelled hydrogen peroxide and hydrogen peroxide adsorbed to a high water-absorbing polymer, and preferably a solid oxygen releasing material such as calcium peroxide.

The high water-absorbing polymers include natural polymers and synthesized polymers. The natural polymers include a starch type polymer such as starch-acrylonitrile graft polymer hydrolysate, starch-acrylic acid graft polymer, starch-styrene sulfonic acid graft polymer, starch-vinyl sulfonic acid graft polymer, and starch-acrylamide polymer, and a cellulose type polymer such as cellulose-acrylonitrile graft polymer, cellulose-styrene sulfonic acid graft polymer, cross-linked carboxy methylcellulose, and others. Also included are polysaccharides such as hyaluronic acid, agarose, and proteins such as collagen.

Synthesized polymers include a polyvinyl alcohol type polymer such as polyvinyl alcohol cross-linked polymer, PVA water absorbing gel freeze-thawed elastomer, and other PVA type polymers. Acrylic type polymers include sodium polyacrylate cross-linked body, sodium acrylate-vinyl alcohol copolymer, polyacrylonitrile type copolymer saponified substance, hydroxyl ethyl methacrylate polymer (HEMA) and the like. Other addition polymers include anhydrous maleic (co)polymer, vinyl pyrrolidone type (co)polymer, and the like. Polyether type polymers include cross-linked polyethylene glycol/diacrylate polymer and the like. Condensation type polymers include ester type polymers, amide type polymers and other condensation type polymers. In particular, a copolymer of polyvinyl alcohol and polyacrylate is preferably used according to the present invention.

These substances can be located at any distance from the region in which the pollutant-degrading microorganism is present. Accordingly, oxygen is not consumed by the microorganism in a short time, but only the oxygen released from the above-mentioned oxygen donor is carried by the flow of the pollutant to the region containing the microorganism.

Similarly, nutrients and minerals are provided in the form of solid or semi-solid, and disposed in the flow of the medium containing the pollutant, above the region of the microorganisms. The method of solidifying these substances includes gelling, adsorption onto water absorbing polymers, and adsorption onto porous materials. Examples of the gelling materials and the high absorbing polymer are the materials similar to those mentioned for forming the solid oxygen donors.

Examples of the porous materials are roughly classified into organic materials and inorganic materials, but particularly preferable is a biodegradable material which is nontoxic and degraded by the microorganisms in the soil after the use.

Organic substances include natural plant agricultural wastes, forestry wastes, dead bodies or wastes of animals, insects and fish and the like. In particular, agricultural and forestry wastes are produced in a large amount and often they are inexpensive and easily available. For example, sawdust, wood chips, bark, stems of corn or sugarcane, chaff of crops such as rice and buckwheat, or coat of grains or beans such as bran and rice bran, and bean curd refuse and the like. Most of these natural materials are porous and the materials necessary for the biodegradation such as nutrients are adsorbed in those pores and the resulting granular material can be effectively used.

Examples of an inorganic porous material include clay minerals, porous ceramics and soil aggregate such as perlite, zeolite, vermiculite, acid clay (montmorillonite), activated clay (aluminium silicate), calcium silicate, diatomaceous earth, silica gel, porous glass, hydroxyl apatite, AKADAMA soil and KANUMA soil.

The form of these solid or semisolid oxygen donors and nutrients is not particularly limited, but it is easy to handle when they are provided in granules. Especially, the fluid containing the pollutant can easily pass through the region containing these materials when they are provided in granules.

The microorganism can be appropriately selected from the microorganisms whose activity to degrade the pollutant has been confirmed.

As the microorganism, usually those cultivated by liquid culture are used. As a culture medium material, those used in culture of the microorganism can be used. For example, bouillon, M9 medium, L medium, Malt extract, MY medium, nitrifying bacteria selective medium and the like are effective. The cultured microorganism can be supplied to the degradation region by injecting the culture dilution directly into the soil to which the pollutant migrates, or by providing the culture adsorbed on the above-mentioned porous material in this region by construction work and the like.

So far more than ten species of microorganisms have been found and isolated as microorganisms capable of degrading trichloroethylene. Among them the representative bacteria can be largely divided into two groups according to the assimilation substrates.

They are methanotroph and aromatic compound, such as phenol, assimilating bacteria. Representative examples of the former include Methylocystis sp. strain M (Agri. Biosci. Biotech. Biochem., 56, 486 (1992), idem 56, 736 (1992)), *Methylosinus trichosporium* OB3b (Am. Chem. Soc. Natl. Meet. Div. Environ. Chem., 29, 365 (1989), Appl. Biochem. Biotechnol. 28, 887 (1991), those having methane monooxygenase. Representative bacteria of the latter include Pseudomonas sp. strain G4 (Appl. Environ. Microbiol., 52, 383 (1986), idem 54, 951 (1988), idem 56, 1279 (1990), idem 56, 279 (1990), idem 57, 1935 (1991)), *Pseudomonas putida* F1 (Appl. Environ. Microbiol., 54, 1703 (1988), idem 54, 2578 (1988)), those having toluene monooxygenase, or toluene dioxygenase. The trichloroethylene (TCE) degrading bacteria assimilate aromatic compounds, and the enzyme to degrade TCE is an enzyme induced by aromatic compounds such as phenol and toluene. Accordingly, these microorganism require a material containing an aromatic compound or a material which can be degraded to aromatic compounds to degrade TCE. Alternatively, it is possible to use a recombinant microorganism or a mutant of the above microorganisms which can express the degradation enzyme without using these inducers. For example, JM1 (FERM BP-5352) which has been made by the inventors of the present application constitutively expresses high TCE degrading ability, so that it can be favorably used for degradation of TCE. The bacteriological properties of JM1 strain are as follows.

Gram's stain and morphology: gram-negative rod

Growth in medium
    BHIA: good
    MacConkey: possible Color of colony: cream Optimal temperature: 25° C.>30° C.>35° C.

Motility: negative (semi-fluid medium)

TSI (slant/butt): alkali/alkali, $H_2S$ (−)

Oxidase: positive (weak)

Catalase: positive

Fermentation of sugar
    glucose: negative
    sucrose: negative
    raffinose: negative
    galactose: negative
    maltose: negative urease: positive esculin hydrolysis (β-glucosidase): positive nitric acid reduction: negative indole production: negative glucose acidification: negative
arginine dehydrase: negative
gelatin hydrolysis (protease): negative
β-galactosidase: negative
Assimilation of compound:
  glucose: negative
  L-arabinose: negative
  D-mannose: negative
  D-mannitol: negative
  N-acetyl-D-glucosamine: negative
  maltose: negative
  potassium gluconate: negative
  n-capric acid: positive
  adipic acid: negative
  d1-malic acid: positive
  sodium citrate: positive
  phenyl acetate: negative The present invention can be applied to in situ treatment, on situ treatment or ex situ treatment of a medium containing a pollutant, but in particular it is effectively used for in situ treatment which is considered to be the most cost-effective treatment.

Then application of the in situ process for purifying a medium containing a pollutant according to the present invention will be described.

Illustratively, an example of purifying ground water contaminated with a pollutant will be explained.

Figure 5:
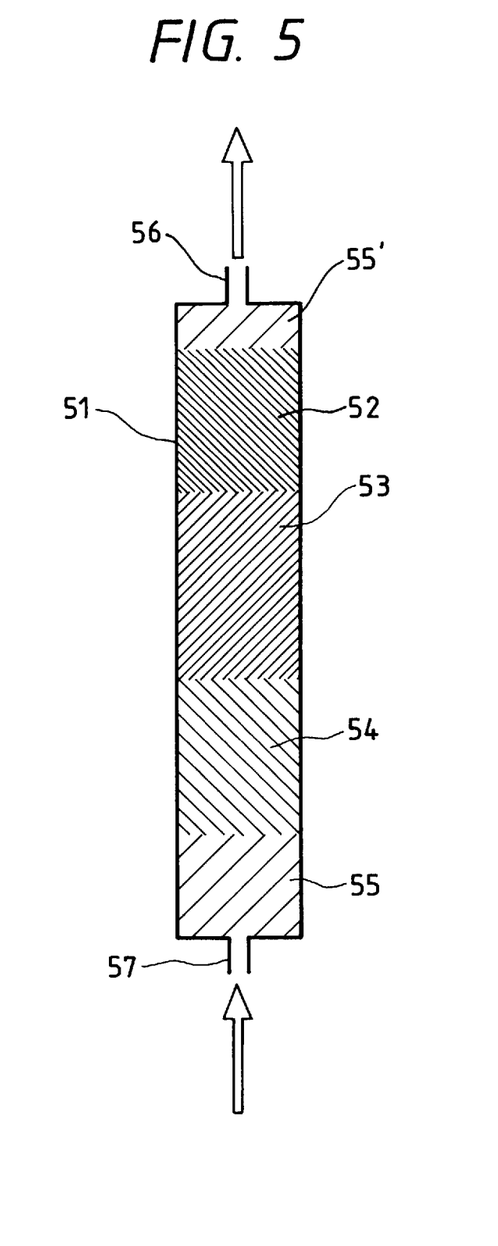
FIG. 5 is a schematic illustration showing the experimental apparatus used in Example according to the present invention.

In the in situ treatment, it is preferable to provide a pollutant degrading apparatus as shown in FIG. 5 in which a region 52 containing the microorganism which can degrade the pollutant and a region 53 and 54 which contain functional materials necessary for the growth and the activation of the microorganisms are separately provided in a tubular vessel 51 having openings 56 and 57 at both ends. Use of such a vessel 51 can prevent the functional materials and the microorganism from diffusing into the environment.

Then the flow of ground water to be treated is observed to understand the flow direction of the pollutant. Then the above-mentioned vessel 51 is so provided in the flow of the ground water that the ground water enters into the vessel through the opening 57 and goes out from the opening 56. This placement allows oxygen and/or nutrients for the growth of the microorganism released from the site containing the functional material in the vessel to be carried by the current into the region containing the microorganism and utilized there to promote the growth and activation of the microorganism so that the degradation of the pollutant can be efficiently carried out. Compared to the case in which the microorganism and the functional materials are provided in mixture, the utilization efficiency of the functional materials by the microorganism is improved and the pollutant degradation efficiency is further improved as well.

Here, the explanation was given with an example in which the contaminated medium was water, but the present invention is not limited to it, and can be applied to a medium having fluidity such as air as well.

"Locating functional materials which release a material required by the microorganism for biodegradation, separate from the microorganism" makes the degrading bacteria to express the maximum degradation ability, allows easy control and improves efficiency. At the same time, it can avoid the growth of unnecessary indigenous microbes and unnecessary outflow of the nutrients into the environment and the eutrophication of the soil or ground water, accordingly the environment contamination can be minimized to enhance the safety.

Further, in the present invention, the functional materials immobilized in the form of semi-solid, so their installation can be simplified as well, and this is a secondary benefit of the present invention.

Since the supply of the functional materials can be optimized, the resources can be saved and the construction can be simplified to yield great economic effects.

The present invention will be further illustrated in detail with the following examples. But those examples are not to be construed to limit the present invention.

Example 1

Figure 1:
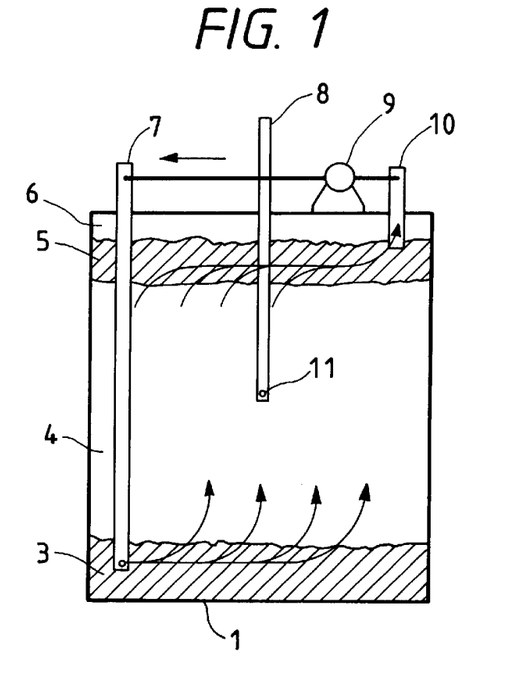
FIG. 1 is a sectional view of an example of the experimental tank according to the present invention.
Figure 2:
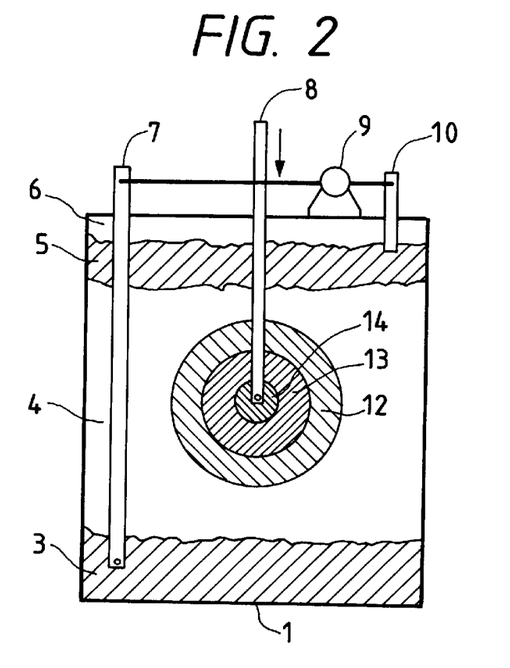
FIG. 2 is a sectional view of an example of the experimental according to the present invention.

Preparation of a model experimental soil is explained referring to FIG. 1 and FIG. 2. In a concrete tank 1 (5 m×5 m×5 m), a gravel layer 3 of 0.5 m thick, a sand layer 4 of 1.4 m thick and a gravel layer 5 of 0.2 m thick were layered in this order from the bottom. Finally the surface was sealed with a concrete layer 6 of 0.2 m thick. An injection tube 8 was provided at the center of the tank, a well 7 which reaches the gravel layer 3 and provided with a strainer was provided in a corner and an exhaust tube 10 which reaches the upper gravel layer 5 in the other corner.

The injection tube 8 had an injection hole 11 at the lower end, and a switch cock (not shown in the figure) at the top of the tube to prevent the back flow. The injection hole 11 served as a fluid injection port under pressure, and also as an intake port for suction of the underground air when biodegradation started.

Air contaminated with trichloroethylene was circulated in the tank, blown into the well 7 and exhausted from the exhaust tube 10 through the lower gravel layer 3 and the sand layer 4, and the pollutant concentration in the air in the tank was controlled to be about 1000 ppm.

Next, in this example, functional materials for biodegradation were sent stepwise through the injection hole 11 in the center so that they were disposed in isolation.

Firstly, an oxygen donor, calcium peroxide granules of 0.1–2.0 mm diameter were mixed with water to make a slurry and 500 l of the resulting slurry was injected (shown as 12 in FIG. 2). The slurry was mixed with any inorganic additive to control the viscosity and water permeability. In this example, the slurry was a 30% by weight suspension containing an equal amount of bentonite.

The distributed calcium peroxide particles reached the region of at most 800 mm (radius) from the injection hole.

Then 500 l of a suspension of high absorbent polymer granules having a diameter of 1 mm, which had adsorbed the nutrients of the following composition was injected (shown as 13 in FIG. 2).

| Carbon source | |
| --- | --- |
| malic acid | 20.0 g |
| Inorganic salts | |
| Na$_2$HPO$_4$ | 6.2 g |
| KH$_2$PO$_4$ | 3.0 g |
| NaCl | 0.5 g |
| NH$_4$Cl | 1.0 g |
| Minerals | |
| nitrilotriacetic acid | 900 μg |
| MgSO$_4$ | 1800 μg |
| MnSO$_4$ | 300 μg |
| NaCl | 600 μg |
| FeSO | 60 μg |
| CaCl$_2$ | 60 μg |
| ZnSO$_4$ | 60 μg |
| CuSO$_4$ | 60 μg |
| AlK(SO$_4$)$_2$ | 60 μg |
| H$_3$BO$_3$ | 60 μg |
| Na$_2$MoO$_4$ | 60 μg |
| NiCl$_2$ | 60 μg |

In this way, a super absorbent polymer granule zone 13 containing nutrients was formed around the injection hole inside the previously supplied calcium peroxide zone 12, and the super absorbent polymer granule zone 13 pushed the calcium peroxide zone 12 out at most to 900 mm from the center. The zone 13 extended for about 800 mm from the center, thus compressing the calcium peroxide zone, although the border was in a mixed state.

Then 200 l of a suspension containing porous particles of average diameter of 2 mm holding the degrading bacterium was injected. Activated charcoal was used in this Example as the porous particles. As the degrading bacterium, strain JM1 (FERM BP-5352) was used at an initial concentration of $5 \times 10^8$ cell/ml. Actually, after microorganism was adsorbed on the porous particles, the number of the microorganism was around $1 \times 10^6$ cell/ml. Accordingly, a zone of degrading microorganism 14 was formed next to the injection hole.

Figure 3:
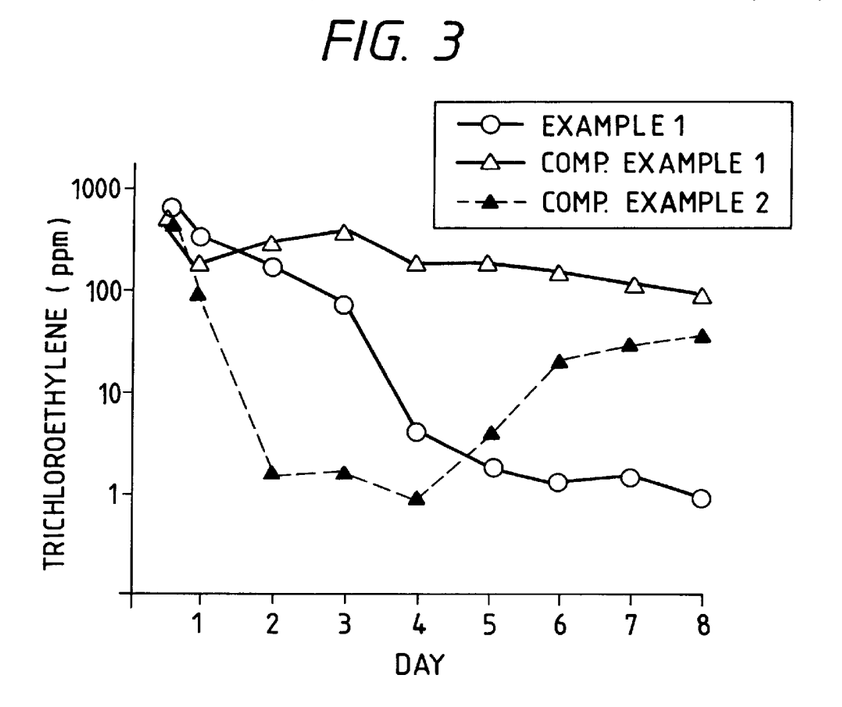
FIG. 3 is a graph showing the change of trichloroethylene concentration with time (days).

The tank was allowed to stand under this state for 40 hours, then air was evacuated through an injection tube at a rate of 20 l/min and trichloroethylene concentration in the gas was measured using a detection tube. The results are shown in FIG. 3.

Comparative Example 1

The same experimental tank was prepared and used as in Example 1, except that the degrading microorganism was not contained in the injected materials. The results are shown in FIG. 3.

Comparative Example 2

The same experimental tank was prepared as in Example 1. Instead of subsequent injection of solid oxygen source, immobilized nutrients and the degrading bacterium, 1200 l of a mixture containing 100 ppm of hydrogen peroxide, nutrients of similar composition as that used in Example 1 containing 2% of malic acid, and the same amount of degrading microorganism as that used in Example 1 was injected through the injection tube into the tank. After standing for 40 hours, the air was evacuated at the rate of 20 l/min and the TCE concentration was measured. The measurement results are shown in FIG. 3.

In Example 1, TCE concentration decreased to several ppm within 4 days and this level was maintained for 4 days or more. On the other hand, in Comparative Example 2 where conventional liquid functional materials and a suspension of the degrading bacterium were injected in a mixture, the low TCE concentration was achieved by the second day to show good degradation, but from the fifth day onwards the level was increased again, inferior to that of Example 1. In the Comparative Example 1 where no degrading bacteria were injected, initial decrease in the TCE concentration was observed due to the natural diffusion and leakage, but no decrease was observed after that. These show that the process of the present invention is effective in maintaining the degradation.

Example 2

Figure 4:
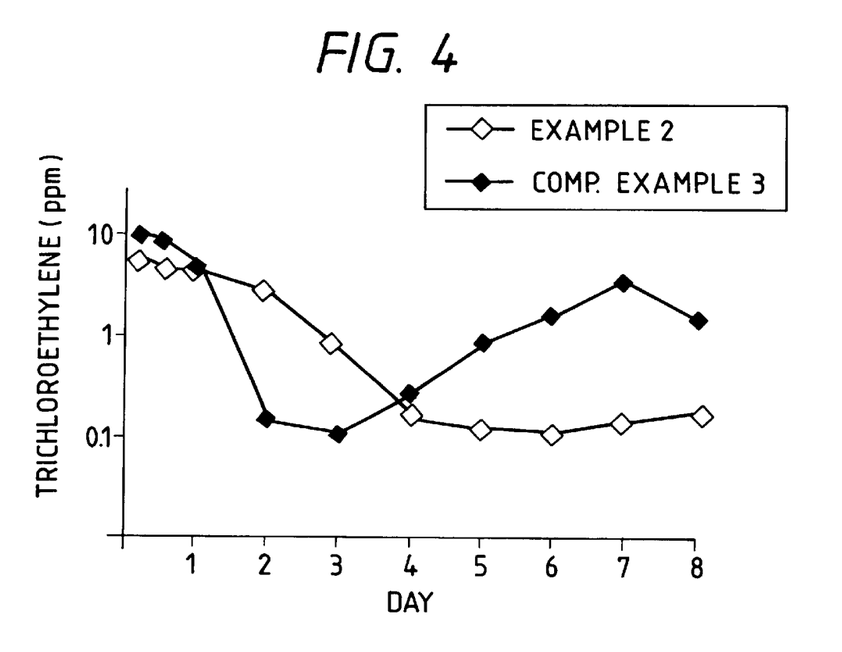
FIG. 4 is a graph showing the change of trichloroethylene concentration with time (days).

In a tubular stainless-steel vessel 51 of 100 mm in diameter, 500 mm in length, having openings (56, 57) at both ends, were packed materials analogous to those used in Example 1 in layer, i.e., an oxygen donor 54, nutrients 53, and pollutant-degrading microorganism 52 each 100 mm thick, from the bottom of the vessel in this order. Then the both ends of the vessel were filled with glass wool, a gas permeable filler, (55, 55'). The vessel was allowed to stand at room temperature (20° C.) for 40 hours, then deoxygenated water (0.1% or less by volume, under 1 atm.) contaminated with 100 ppm trichloroethylene was passed through at a flow rate of 5 l/min from the lower end of the vessel in the direction of the arrow. The trichloroethylene concentration of the water at the upper end of the vessel was measured by gas chromatography. The results are shown in FIG. 4.

Comparative Example 3

A vessel having the same structure as that used in Example 2 was packed with foamed cellulose beads which had been immersed in a mixed solution of nutrients and degrading microorganism; the beads were filled in the tube with a thickness of 300 mm and both ends were plugged with glass wool. The vessel was allowed to stand for 40 hours as in Example 2 and 10 ppm trichloroethylene contaminated water was passed through at a flow rate of 5 l/min. The water had been sufficiently aerated and contained almost saturation level of oxygen (2–3% by volume under normal pressure). The results are shown in FIG. 4.

By comparing Example 2 and Comparative Example 3, it is understood that in Comparative Example 3, degradation proceeded in an early stage of from second to third day but from fourth day degradation effect tended to decline, on the other hand, Example 2 showed lower degradation level in the initial stage, but the degradation effect increased rapidly from the third day and it was remarkably maintained.

What is claimed is:

1. An apparatus for degrading a pollutant to purify a medium containing the pollutant by using a microorganism, comprising a container in which a region containing a microorganism capable of degrading the pollutant is provided, wherein the container has a first opening for introducing the medium into the container and a second opening for draining the medium passed through the region containing microorganism from the container, and in the container a region containing a functional material which releases a material required by the microorganism for degrading the pollutant is provided between the first opening and the region containing the microorganism.

2. The apparatus for degrading a pollutant according to claim 1, wherein the container is a bioreactor having means to control the growth conditions for the microorganism in the container.

3. The apparatus for degrading a pollutant according to claim 1, wherein the functional material is in a solid or semi-solid form.

4. The apparatus for degrading a pollutant according to claim 1, wherein the functional material is a material which can supply oxygen to the microorganism.

5. The apparatus for degrading a pollutant according to claim 4, wherein the material which can supply oxygen contains hydrogen peroxide.

6. The apparatus for degrading a pollutant according to claim 4, wherein the material which can supply oxygen contains calcium peroxide.

7. The apparatus for degrading a pollutant according to claim 1, wherein the functional material is a nutrient supplying material to the microorganism.

8. The apparatus for degrading a pollutant according to claim 1, wherein the region containing the functional material comprises a region containing an oxygen donor to the microorganism, and a region containing a nutrient supplying agent to the microorganism, provided in this order between the first opening and the region containing the microorganism.

9. A process for purifying a flow of a medium containing a pollutant, comprising the steps of:

providing an apparatus for degrading a pollutant comprising a container in which a region containing a microorganism capable of degrading the pollutant is provided, wherein the container has a first opening for introducing the medium into the container and a second opening for draining the medium passed through the region containing microorganism from the container, and in the container a region containing a functional material which releases a material required by the microorganism for degrading the pollutant is provided between the first opening and the region containing the microorganism; and locating the apparatus for degrading the pollutant in the flowing medium so that the pollutant is introduced into the container from the first opening.

10. The process for purifying a contaminated medium according to claim 9, wherein the medium is water.

11. A process for degrading a pollutant by providing a microorganism capable of degrading the pollutant in a flow of a medium containing the pollutant, comprising the steps of:

providing a functional material which releases a material required for degrading the pollutant by the microorganism in the flow of the medium; and disposing the microorganism in the flow of the medium downstream from the functional material thereby the pollutant is degraded by the microorganism.

12. The process for degrading a pollutant according to claim 11, wherein the functional material is fixed in a solid or semi-solid form, the functional material is slowly released for the microorganism.

13. The process for degrading a pollutant according to claim 11, wherein the functional material is a material which can supply oxygen to the microorganism.

14. The process for degrading a pollutant according to claim 13, wherein the material which can supply oxygen contains hydrogen peroxide.

15. The process for degrading a pollutant according to claim 13, wherein the material which can supply oxygen contains calcium peroxide.

16. The process for degrading a pollutant according to claim 11, wherein the functional material is a nutrient supplying material to the microorganism.

17. The process for degrading a pollutant according to claim 11, wherein an agent to supply oxygen to the microorganism and an agent to supply a nutrient to the microorganism are provided as the functional material in this order along the flow.

* * * * *

UNITED STATES PATENT AND TRADEMARK OFFICE
CERTIFICATE OF CORRECTION

PATENT NO. : 5,866,003

DATED : February 2, 1999

INVENTOR(S) : YUKITOSHI OKUBO, ET AL.  Page 1 of 3

It is certified that error appears in the above-identified patent and that said Letters Patent is hereby corrected as shown below:

On the title page, item:

[56] REFERENCES CITED

FOREIGN PATENT DOCUMENTS

Insert: --073675  3/1983  Eur. Pat. Off.--.

AT [56] REFERENCES CITED

OTHER PUBLICATIONS

Insert: --Patent Abstracts of Japan, Vol. 95, No. 8, 9/1995 for JP 7-136677.
Patent Abstracts of Japan, Vol. 96, No. 2, 2/1996 for JP 7-256286.--
"Sheilds, et al." should read --Shields, et al.--.

COLUMN 2

Line 33, "in short." should read --in short supply.--;
Line 37, "above mentioned" should read --above-mentioned--; and
Line 58, "is" should read --of--.

COLUMN 3

Line 6, "that" should be deleted;
Line 17, "second" should read --secondary--;
Line 49, "bioreactor, on" should read --bioreactor. On--; and
Line 51, "spoils" should read --spoiling--.

UNITED STATES PATENT AND TRADEMARK OFFICE
CERTIFICATE OF CORRECTION

PATENT NO. : 5,866,003

DATED : February 2, 1999

INVENTOR(S) : YUKITOSHI OKUBO, ET AL.

It is certified that error appears in the above-identified patent and that said Letters Patent is hereby corrected as shown below:

COLUMN 4

Line 10, "where" should read --which--;
    Line 22, "the maintained" should read --to maintain--;
    Line 29, "stand" should read --stand- --;
    Line 32, "In" should be deleted;
    Line 45, "are" should read --is--; and
    Line 47, "A still" should read --Still--.

COLUMN 5

Line 28, "thereby" should read --whereby--; and
    Line 36, "mental" should read --mental tank--.

COLUMN 7

Line 55, "(aluminium" should read --(aluminum--.

COLUMN 8

Line 34, "microorganism" should read --microorganisms--.

COLUMN 9

Line 22, "Then" should read --Now--; and
    Line 65, "immobilized" should read --are immobilized--.

COLUMN 10

Line 33, "any" should read --an--; and
    Line 42, "as" should read --at--.

UNITED STATES PATENT AND TRADEMARK OFFICE
CERTIFICATE OF CORRECTION

PATENT NO. : 5,866,003

DATED : February 2, 1999

INVENTOR(S) : YUKITOSHI OKUBO, ET AL.

It is certified that error appears in the above-identified patent and that said Letters Patent is hereby corrected as shown below:

COLUMN 14

Line 1, "thereby" should read --whereby--; and
    Line 5, "the" should read --wherein the--.

Signed and Sealed this

Twenty-second Day of February, 2000

Attest:

Q. TODD DICKINSON

*Attesting Officer*       *Commissioner of Patents and Trademarks*